(12) United States Patent
Bassemir et al.

(10) Patent No.: US 9,792,908 B1
(45) Date of Patent: Oct. 17, 2017

(54) ANALYZING SPEECH DELIVERY

(71) Applicant: International Business Machines Corporation, Armonk, NY (US)

(72) Inventors: Richard T. Bassemir, Austin, TX (US); Beth L. Hoffman, Austin, TX (US); David Jimenez, Austin, TX (US); Britney Tong, Austin, TX (US); Yvonne M. Young, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/337,007

(22) Filed: Oct. 28, 2016

(51) Int. Cl.
| | |
|---|---|
| *G10L 21/00* | (2013.01) |
| *G10L 15/22* | (2006.01) |
| *G10L 25/51* | (2013.01) |
| *G10L 15/06* | (2013.01) |
| *G06F 17/28* | (2006.01) |

(Continued)

(52) U.S. Cl.
CPC ............ *G10L 15/22* (2013.01); *G06F 3/0482* (2013.01); *G06F 17/28* (2013.01); *G09B 5/02* (2013.01); *G09B 19/04* (2013.01); *G10L 15/063* (2013.01); *G10L 15/30* (2013.01); *G10L 25/51* (2013.01);
(Continued)

(58) Field of Classification Search
CPC ..... G10L 15/063; G10L 25/48; G10L 13/027; G10L 15/07; G10L 15/08; G10L 15/18; G10L 15/22; G10L 2015/0638; G10L 2015/081; G10L 2015/085; G10L 25/60; H04M 2201/40; H04M 3/2227; G06Q 30/0201; G06Q 10/0639; H04L 43/08

USPC ....... 704/235, 270, 275, 231, 239, 246, 251, 704/270.1, 278; 379/265.03, 265.06, 379/265.07, 88.09; 705/7.14, 7.38; 370/252
See application file for complete search history.

(56) References Cited

U.S. PATENT DOCUMENTS 7,627,475 B2 * 12/2009 Petrushin ................ G10L 17/26
704/231
7,941,318 B2    5/2011 Lu
(Continued)

OTHER PUBLICATIONS

Tao et al., ("The influence of automatic speech recognition accuracy on the performance of an automated speech assessment system", Spoken Language Technology workshop (SLT), 2014, IEEE, 7-10, 2014, pp. 294-299).*

(Continued)

*Primary Examiner* — Vijay B Chawan
(74) *Attorney, Agent, or Firm* — Scully, Scott, Murphy & Presser, P.C.; Lisa J. Ulrich, Esq.

(57) ABSTRACT

In an aspect of the present disclosure, a method for analyzing the speech delivery of a user is disclosed including presenting to the user a plurality of speech delivery analysis criteria, receiving from the user a selection of at least one of the speech delivery analysis criterion, receiving, from at least one sensing device, speech data captured by the at least one sensing device during the delivery of a speech by the user, transmitting the speech data and the selected at least one speech delivery analysis criterion to an analysis engine for analysis based on the selected at least one speech delivery analysis criteria, receiving, from the analysis engine an analysis report for the speech data, the analysis report comprising an analysis of the speech data performed by the analysis engine based on the selected at least one criterion, and presenting to the user the analysis report.

20 Claims, 3 Drawing Sheets

(51) Int. Cl.
*G10L 15/30* (2013.01)
*G06F 3/0482* (2013.01)
*G09B 19/04* (2006.01)
*G09B 5/02* (2006.01)
*G10L 15/26* (2006.01)

(52) U.S. Cl.
CPC ........ *G10L 15/26* (2013.01); *G10L 2015/221* (2013.01)

(56) References Cited

U.S. PATENT DOCUMENTS

| | | | | |
|---|---|---|---|---|
| 8,204,884 B2* | 6/2012 | Freedman | ............... | G06Q 30/06 379/265.06 |
| 8,654,937 B2* | 2/2014 | Agapi | ................. | H04M 3/5175 379/265.02 |
| 8,700,396 B1* | 4/2014 | Mengibar | ............. | G10L 15/063 704/235 |
| 8,781,880 B2* | 7/2014 | Kocsor | ............ | G06Q 10/06375 705/7.37 |
| 9,015,046 B2* | 4/2015 | Pereg | ................. | G06Q 10/063 379/265.01 |
| 9,177,558 B2 | 11/2015 | Chen et al. | | |
| 9,251,809 B2* | 2/2016 | Reiner | ................... | G10L 25/48 |
| 2004/0249650 A1* | 12/2004 | Freedman | ............. | G06Q 30/02 705/7.29 |
| 2005/0119894 A1 | 6/2005 | Cutler et al. | | |
| 2006/0149558 A1* | 7/2006 | Kahn | ................... | G10L 15/063 704/278 |
| 2006/0235742 A1* | 10/2006 | Castellanos | ............ | G06Q 10/04 705/7.29 |
| 2008/0250452 A1* | 10/2008 | Iwamoto | ................ | H04H 20/93 725/39 |
| 2011/0206198 A1* | 8/2011 | Freedman | .............. | G06Q 30/06 379/265.03 |
| 2011/0270605 A1 | 11/2011 | Qin et al. | | |
| 2013/0148525 A1* | 6/2013 | Cuadra Sanchez | ... | H04L 41/147 370/252 |
| 2013/0311190 A1* | 11/2013 | Reiner | .................... | G10L 25/48 704/270 |
| 2014/0278455 A1* | 9/2014 | Chandrasekaran | | G06Q 30/0203 705/2 |
| 2015/0199959 A1* | 7/2015 | Skoglund | ................ | G10L 25/60 704/239 |
| 2015/0256675 A1* | 9/2015 | Sri | ...................... | H04M 3/5183 379/265.09 |
| 2015/0310852 A1 | 10/2015 | Spizzo et al. | | |

OTHER PUBLICATIONS

Disclosed Anonymously, "New Age Presentation Tool" IP.com No. IPCOM00240867D. dated Mar. 6, 2016, pp. 1-3.
"Method to assess speech intelligibility of Full Face Quick Donning (FFQDM) Mask", An IP.com Prior Art Database Technical Disclosure, IP.com No. IPCOM000244366D, dated Dec. 7, 2015, pp. 1-9.
Tao J., "The Influence of Automatic Speech Recognition Accuracy on the Performance of an Automated Speech Assessment System", Printed on Oct. 27, 2016, pp. 294-299.

* cited by examiner

ANALYZING SPEECH DELIVERY

BACKGROUND

The present disclosure relates to the analysis and evaluation of a user's speech delivery and in some aspects to providing recommendations for improving the user's speech delivery.

Speech delivery falls somewhere between art and science. An individual that aspires to become a great speaker will often seek out ways to become better at delivering a speech. For example, some individuals will read books about speech delivery, read well-known speeches, or look to other similar sources for inspiration or instruction on how to deliver a better speech.

Since dozens of factors may affect an individual's speech delivery, it may be difficult to determine which factors need the most improvement. Becoming a good speaker and giving a well received speech comes with a lot of practice and the need for feedback. There are several impediments to receiving sufficient feedback in order to make the necessary improvements. For example, a fear of public speaking can impede the ability to do a self-evaluation. Audience members or other people can evaluate a speaker and provide feedback, but human evaluators are naturally only able to focus on a few criteria at a time perhaps only giving a general impression with one or two suggested areas of improvement.

SUMMARY

The system, method, and computer program product described herein provide for an analysis of a user's speech delivery based on criteria selected by the user. The analysis may be performed, for example, by an analysis engine trained with a corpus of training data specific to the selected criteria.

In an aspect of the present disclosure, a method for analyzing the speech delivery of a user is disclosed. The method includes presenting to the user, via a graphical user interface on a display of a computing device, a plurality of speech delivery analysis criteria, receiving, from the user via the computing device a selection of at least one of the speech delivery analysis criterion, receiving, by the computing device, from at least one sensing device, speech data captured by the at least one sensing device during the delivery of a speech by the user, transmitting the speech data and the selected at least one speech delivery analysis criterion to an analysis engine for analysis based on the selected at least one speech delivery analysis criteria, receiving, from the analysis engine an analysis report for the speech data, the analysis report comprising an analysis of the speech data performed by the analysis engine based on the selected at least one criterion, and presenting, to the user, via the graphical user interface, the analysis report.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The present disclosure provides methods and systems that analyze a user's speech delivery and provide recommendations on how to improve the user's speech delivery based on the analysis.

Figure 1:
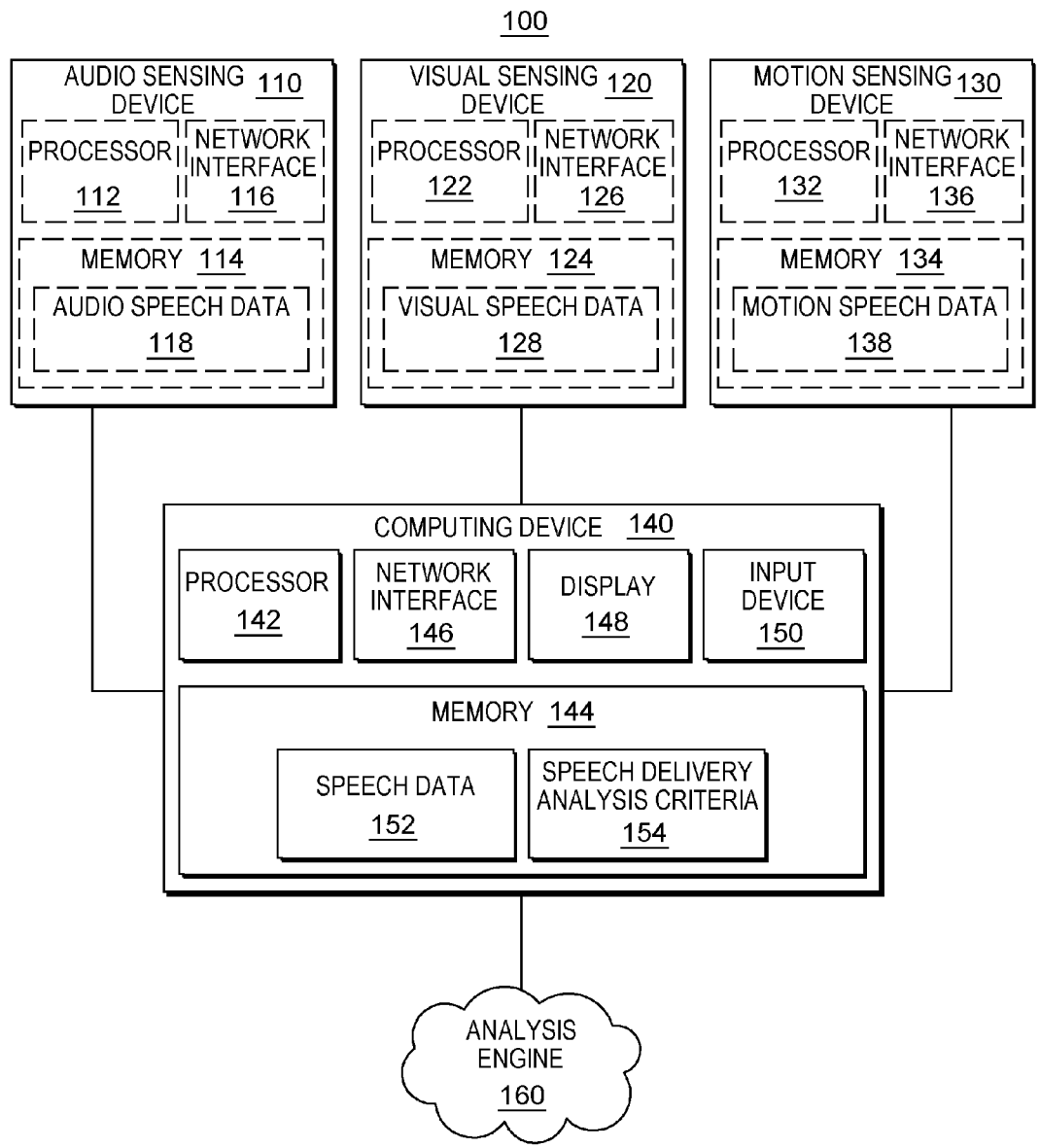
FIG. 1 is a system diagram in accordance with an aspect of the present disclosure.

With reference now to FIG. 1, a system 100 for analyzing a user's speech delivery and providing improvement recommendations is illustrated. System 100 is configured to gather speech data during a user's speech delivery and to analyze the speech data according to a set of analysis criteria. In some aspects, the set of analysis criteria may be set by the user.

In some aspects, system 100 includes an audio sensing device 110, a visual sensing device 120, a motion sensing device 130, a computing device 140, and an analysis engine 160.

Audio sensing device 110 is configured to capture or record a user's speech delivery and in some aspects a reaction of an audience to the user's speech delivery. In some aspects, the captured or recorded data may be stored in a memory 114 of audio sensing device 110 as audio speech data 118. In some aspects, the captured or recorded data may be transmitted directly to computing device 140 or analysis engine 160 without being stored by audio sensing device 110.

In some aspects, for example, audio sensing device 110 may include a microphone or other audio sensing device that is positioned to capture the user's speech deliver, e.g., a microphone mounted on a podium where the user will deliver the speech, a microphone mounted on a headset worn by the user, a microphone that is attached to the user's clothing, or any other microphone that may record the user's speech delivery. In some aspects, an audio sensing device 110 may include a microphone positioned near the audience that may be used to capture reactions of the audience to the user's speech delivery. In some aspects, more than one audio sensing device 110 may be employed to capture the user's speech delivery and any reaction by the audience.

In some aspects, audio sensing device 110 may include a processor 112, memory 114, and a network interface 116.

Processor 112 may include, for example, a microcontroller, Field Programmable Gate Array (FPGA), or any other processor that is configured to perform various operations. Processor 112 may be configured to execute instructions as described below. These instructions may be stored, for example, in memory 114.

Memory 114 may include, for example, non-transitory computer readable media in the form of volatile memory, such as random access memory (RAM) and/or cache memory or others. Memory 114 may include, for example, other removable/non-removable, volatile/non-volatile storage media. By way of non-limiting examples only, memory 710 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Memory 114 may be configured to store audio speech data 118 sensed or monitored by audio sensing device 110. For example, audio speech data 118 may include a recording of the speech delivery of the user as sensed by audio sending device 110.

Network interface 116 is configured to transmit and receive data or information to and from a computing device 140 via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, or any other form of communication that allows audio sensing device 110 to transmit or receive information.

In some aspects, network interface 116 may allow audio sensing device 110 to communicate directly with computing device 140. For example, audio sensing device 110 may transmit audio speech data 118 to computing device 140 using network interface 116. In some aspects, network interface 116 may communicate with computing device 140 via an intermediary network, for example, a local area network (LAN), wide area network (WAN), the internet, or other similar networks. In some aspects, audio sensing device 110 may communicate directly with analysis engine 160. For example, audio sensing device 110 may transmit audio speech data 118 directly to analysis engine 160 without first transmitting the speech data to computing device 140.

Visual sensing device 120 is configured to capture or record a visual record of the user's speech delivery and in some aspects a reaction of an audience to the user's speech delivery. In some aspects, the captured or recorded data may be stored in a memory 124 of visual sensing device 120 as visual speech data 128. In some aspects, the captured or recorded data may be transmitted directly to computing device 140 or analysis engine 160 without being stored by visual sensing device 120.

In some aspects, for example, visual sensing device 120 may include a video camera or other visual sensing device that is positioned to visually capture the user's speech deliver. In some aspects, visual sensing device 120 may include a video camera positioned to visually capture some or all of the audience to capture reactions of the audience to the user's speech delivery. In some aspects, more than one visual sensing device 120 may be employed to capture the user's speech delivery and any reaction by the audience. In some aspects, visual sensing device 120 may also include audio sensing device 110.

In some aspects, visual sensing device 120 may include a processor 122, memory 124, and a network interface 126 that may function in a similar manner to processor 112, memory 114, and network interface 116. In some aspects, speech data 128 captured by visual sensing device 120 may be stored in memory 124 and may be transmitted to computing device 140 or analysis engine 160 via network interface 126.

Motion sensing device 130 is configured to capture or record motions made by the user during the user's speech delivery. In some aspects, the captured or recorded data may be stored in a memory 134 of motion sensing device 130 as motion speech data 138. In some aspects, the captured or recorded data may be transmitted directly to computing device 140 or analysis engine 160 without being stored by motion sensing device 130.

In some aspects, motion sensing device 130 may include, for example, a wearable device that may be worn by the user or otherwise affixed to the user to capture movements or motions of the user. In some aspects, for example, motion sensing device 130 may be a gyroscope or other similar device. In some aspects, motion sensing device 130 may be a smart mobile device or wearable device of the user. For example, motion sensing device 130 may be worn on the user's hand, wrist, sleeve, or head, in a pocket, held in the user's hand, or worn or affixed to any other location that may be used to capture motion by the user. For example, motion sensing device 130 may capture hand motions, head motions, fidgeting, waving, or other similar motions which may be used to analyze whether the user's motions are detracting from the users speech delivery. For example, the captured motions may be used to determine whether the user is constantly waving his or her hands around, which may be distracting to the audience and take away from the user's speech delivery. Similarly, the captured motions may be used to determine whether the user is tapping the podium or wringing his or her hands or other similar motions that may indicate that he or she is showing nervousness to the audience, which may also take away from the user's speech delivery. In some aspects, more than one motion sensing device 130 may be employed to capture the user's speech delivery. For example, the user may wear a motion sensing device 130 on each wrist, may wear a motion sensing device 130 on the head, for example, a hair clip or other item, or other similar locations.

In some aspects, visual sensing device 120 may also function as a motion sensing device 130. For example, image processing may be performed on the captured visual speech data 128 to track motions made by the user during the user's speech delivery.

In some aspects, motion sensing device 130 may include a processor 132, memory 134, and a network interface 136 that may function in a similar manner to processor 112, memory 114, and network interface 116. In some aspects, motion speech data 138 captured by motion sensing device 120 may be stored in memory 134 and may be transmitted to computing device 140 or analysis engine 160 via network interface 136.

Computing device 140 includes a processor 142, memory 144, network interface 146, display 148, input device 150, and any other features common to a computing device. In some aspects, computing device 140 may, for example, be any computing device that is configured to receive audio speech data 118, visual speech data 128, and motion speech data 138 from audio sensing device 110, visual sensing device 120, and motion sensing device 130 and to transmit the received audio speech data 118, visual speech data 128 and motion speech data 138 to analysis engine 160. In some aspects, the received audio speech data 118, visual speech data 128, and motions speech data 138 may be stored in memory 144 of computing device 140 as speech data 152. In some aspects, computing device 140 may include, for example, personal computers, laptops, tablets, smart devices, smart phones, smart wearable devices, smart watches, or any other similar computing device. Processor 142, memory 144, and network interface 146 may function in a similar manner as described above with respect to processor 112, memory 114, and network interface 116.

Display 148 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 148 may include a liquid crystal display (LCD), an e-paper/e-ink display, an organic LED (OLED) display, or other similar display technologies. In some aspects, display 148 may be touch-sensitive and may also function as an input device 150.

Input device 150 may include, for example, a keyboard, a mouse, a touch-sensitive display, a keypad, a microphone, or other similar input devices or any other input devices that may be used alone or together to provide a user with the capability to interact with computing device 140. In some aspects, input device 150 may also include an scanning device that may be configured to scan speech written on a tangible medium, e.g., paper, into digital form for storage in memory 144 and for analysis by computing device 140 and analysis engine 160. In some aspects, computing device 140 may be configured to perform optical character recognition (OCR) on the digital form of the scanned speech to generate textual data that may be used by computing device 140 and analysis engine 160 during analysis of the speech.

In some aspects, some or all of audio speech data 118, visual speech data 128, motion speech data 138, and speech data 152 may be sent to the cloud for remote analysis by an analysis engine 160. For example, the analysis engine 160 may be configured to analyze the received speech data 118, 128, 138, 152 to measure or determine how well the user's speech delivery meets a plurality of speech delivery criteria. In some aspects, analysis engine 160 may detect a tone of the speech delivery, determine a length of the speech delivery, detect key phrases in the speech delivery, translate audio speech data 118 to text, and analyze audio speech data 118, visual speech data 128, motion speech data 138 and the translated text of the speech delivery to generate possible suggestions for how to improve the user's speech delivery.

In some aspects, analysis engine 160 is configured to analyze both structured and unstructured data by applying advanced natural language processing, information retrieval, knowledge representation, automatic cognitive reasoning, and machine learning technologies. In some aspects, analysis engine 160 may be trained using a corpus of training data that is specific to a particular task. For example, analysis engine 160 may include a neural network or other similar machine learning system. In some aspects, analysis engine 160 may be trained to analyze the user's speech delivery according to a particular criterion using a corpus of training data specific to that criterion. For example, the corpus of training material may provide analysis engine 160 with examples of speech deliveries and corresponding analysis of the example speech deliveries according to the criterion. An example analysis engine 160 that may be used to analyze a user's speech delivery is IBM Watson®. In some aspects, existing analysis tools used by IBM Watson® may be leveraged including, for example, Alchemy API, Personality Insights, Speech to Text, and Tone Analyzer tools. In some aspects, IBM Watson® may be trained with additional analysis tools by providing a training corpus of data for a specific criterion to be used in analysis of the user's speech delivery. In some aspects, analysis engine 160 may have access to one or more databases of speeches and speech criteria that may be utilized for analyzing the user's speech delivery.

In some aspects, the user may input a hard copy of the text of the speech to computing device 140 prior to delivery of the speech for analysis, for example, using a scanner or other similar device. In some aspects, the user may provide a digital version of the speech to computing device 140 for analysis. In some aspects, the provided text of the speech may be analyzed by analysis engine 160 prior to delivery of the speech by the user.

In some aspects, the user may input speech goals into computing device 140 using input device 150 including, for example, the purpose of the speech (entertaining, selling, educational, technical, etc.), the audience type (technical, age, marketing, sales, executives, etc.) and the anticipated duration of the speech. For example, the user may be presented with a graphical user interface on display 150 by computing device 140 including fields that are selectable to input the purpose, audience type, and duration. These inputted goals may be used by analysis engine 160 to select appropriate categories of analysis materials or training corpus for training analysis engine 160.

In some aspects, computing device 140 may be configured to present a set of speech delivery analysis criteria 154 to the user via display 148. In some aspects, the set of speech delivery analysis criteria 154 that is presented to the user via display 148 may be based on the purpose, audience type, and anticipated durations of the speech that is input by the user to computing device 140. The computing device 140 may be configured to receive from the user a selection via input device 150 of some or all of the presented speech delivery analysis criteria 154 for use by analysis engine 160 to analyze the speech data 152. In some aspects, a user profile may be stored in memory 144 of computing device 140 including the speech delivery analysis criteria 154 selected by the user such that the user may easily re-use the same speech delivery analysis criteria 154 each time the user delivers the same speech or for other speeches delivered by the user.

In some aspects, the user may select from the following non-limiting list of speech delivery analysis criteria:

A. Dynamic vs. Sameness:

An analysis measure of the energy level of the user's speech delivery and how that energy level is varied throughout the speech. For example, the user may deliver the speech in a calming manner which soothes the audience, may be deliver the speech in an energetic and dynamic manner which "pumps" the audience up or injects the audience with energy or excitement, or other similar measures of energy levels of the speech. For example, the user may start with a calming speech delivery and build into a dynamic or high energy speech delivery when making a key point. In some aspects, for example, analysis engine 160 may be trained to determine the dynamic or sameness of the user's speech delivery using a training corpus of speeches in which speeches are delivered with varying levels of energy. In some aspects, for example, the tone or pitch of the speech delivery may be tracked to determine how much the user's tone and pitch varied over the course of the speech delivery. For example, the speech delivery may be analyzed to determine an average tone and pitch used by the user. The individual portions, sections, sentences, or words of the speech delivery may then be compared to the average to determine an amount of variation. For example, if the speech delivery has an average tone or pitch of 40/100, where 100 is a maximum tone or pitch and 0 is a minimum tone or pitch, the analysis may determine how much the user's tone or pitch varies from 40/100. For example, if the user's tone or pitch varies between say, 35 and 45, the tone or pitch may be considered to be monotone or have "sameness". In contrast, if the user's tone or pitch varies from say 20 to 80 during the speech delivery, the user's speech delivery may be considered dynamic. Each individual sentences, paragraph, or portion of the user's speech delivery may be individually analyzed for dynamic vs. sameness. In some aspects, the entire speech may be analyzed. In some aspects, the speech delivery may be rated, for example, on a scale of 1 to 10 for how well the user used dynamic and sameness throughout the speech. Any other rating may be used. In addition, in some aspects, the analysis may indicate what part of the speech was calming or included sameness and what part of the speech was dynamic.

B. Use of Repetition to Make a Point:

An analysis of how many times the same or similar point is made by the user during speech delivery. This may be measured based on the audio speech data 118 and/or text of the speech. For example, the audio data may be converted to text using a speech to text tool or analysis, either at computing device 140 or at analysis engine 160, and may be analyzed for a point, series of words, or a phrase that are repeated a number of times. In some aspects, the speech delivery may be rated, for example, on a scale of 1 to 10 for how well the user used repetition to make a point. Any other rating may be used. In addition, in some aspects, the analysis may indicate what part of the speech included the use of repetition to make a point.

C. Conversation vs. a Lecture:

An analysis of whether the user is presenting information to the audience or engaging the audience in a conversation. This may be measured based on the audio speech data 118 and/or text of the speech. For example, the audio data may be converted to text using a speech to text tool or analysis, either at computing device 140 or at analysis engine 160, and may be analyzed for audience engagement. Audience engagement may be determined, for example, by an analysis of the speech delivery for key words or phrases that indicate the method of presentation. In some aspects, the speech delivery and audience feedback may be analyzed together to determine whether there is a give and take between the user and the audience. For example, audio speech data 118 may be gathered from both the user and the audience and may be used to determine the interaction between the user and the audience. In some aspects, the analysis may differentiate between speakers through text or audio analysis, for example, determining when the user is speaking and when an audience member is speaking.

In some aspects, the analysis may determine what percentage of time during the speech delivery included feedback or a reaction from the audience as compared to the user speaking. In some aspects, the speech delivery may be rated, for example, on a scale of 1 to 10 for whether it was a lecture or a conversation. Any other rating may be used. For example, a lecture rating of 5 and conversation rating of 3 may indicate that the speech delivery was more of a lecture than a conversation. In addition, in some aspects, the analysis may indicate where in the speech the user was lecturing and where in the speech the user was delivering a conversation.

In some aspects, the user may indicate as part of the criteria selection that the goal of the speech delivery was to be a panel type speech delivery or a lecture type speech delivery. The user may then receive, based on the analysis, an indication of whether this goal was met or how close the user made it to the goal.

D. Bringing Characters to Life:

Where the speech includes multiple characters or viewpoints, an analysis of whether the user has delivered each character or viewpoint as a distinct and separate voice may be warranted. The analysis may include an analysis of the audio speech data 118 to determine of the vocal variety used by the user during speech delivery for each character and whether the user has sufficiently separated out each character during the speech delivery with descriptions. In some aspects, the audio speech data 118 may be converted to text using a voice to text tool and the text may be analyzed to determine where in the speech delivery each character is presented. In some aspects, the speech delivery may be rated, for example, on a scale of 1 to 10 for how well characters have been brought to life. Any other rating may be used. In addition, in some aspects, the analysis may indicate where in the speech a particular character was not delivered as a separate character or view point.

E. Clarity and Brevity:

This analysis may determine whether the words used by the user during the speech are clear and concise and whether or not the speech included words that are complex or may have multiple meanings. In some aspects, for example, analysis engine 160 may be trained with baseline guidance levels for clarity and brevity according to standard classifications. For example, analysis engine 160 may be trained to assess what writing level the speech delivery corresponds to, e.g., fifth grade level, sixth grade level, high school level, college level, industry level, etc. In some aspects, the user's speech deliver may be compared to the baseline guidance level to determine what level of audience the speech delivery is rated for. In some aspects, the user may input as part of the selection criteria a level for the audience, e.g., and audience with a sixth grade education and the analysis may determine whether the clarity and brevity of the speech was appropriate for that level. The speech delivery may be rated, for example, on a scale of 1 to 10 for clarity and brevity. Any other rating may be used. In addition, in some aspects, the analysis may indicate where complex words or words having multiple meanings were used in the speech. In some aspects, the analysis may also indicate which words are clear and concise. In some aspects, for example, the analysis may provide a report including a textual version of the speech delivery having indications of which words are appropriate for each level. For example, the words in the textual version may be color coded according to level, e.g., green for fifth grade level, orange for sixth grade level, yellow for high school level, etc.

F. Speech Ticks:

This analysis may determine whether the user has used common speech ticks during the speech that add little to no value to the speech. These words may be words that are used to fill a silence, or words used by the user when they are thinking about what to say such as ah's, um's, ya-know, so, etc. The audio speech data 118 may be analyzed by computing device 140 or analysis engine 160 to generate text which may be analyzed for speech ticks. The speech delivery may be rated, for example, on a scale of 1 to 10 for how often speech ticks occur. Any other rating may be used. In some aspects, the number of speech ticks may be counted and provided to the user. In addition, in some aspects, the analysis may indicate where the speech ticks occurred in the speech delivery.

G. Positive and Negative Toned Words:

This analysis may determine whether the user has used words having positive or negative tones, e.g., connotations, during the speech. In some aspects, the audio speech data 118 may be converted to text using a voice to text tool and the text may be analyzed to determine the tone of the words used during the speech delivery. In some aspects, the tone of the entire speech may be analyzed to determine whether the user's speech delivery meets a tone criteria set by the user during criteria selection. For example, the user may wish to deliver a speech having a positive or uplifting tone. The words used by the user during the speech delivery may be analyzed to determine whether or not the user did indeed succeed in presenting a positive or uplifting speech. In some aspects, each word, sentence, paragraph, or other portion of the speech delivery may be individually analyzed to determine a tone and context of the words used. The analyses may then provide the user with an indication of which words, sentences, paragraphs, or other portions of the speech delivery had a positive tone, and which words, sentences, paragraphs, or other portions of the speech delivery had a negative tone. In some aspects, the analysis engine 160 may also present to the user suggested words that may be substituted with words that were used to change the tone from a negative tone to a positive tone or vice versa. In some aspects, the speech delivery may be rated, for example, on a scale of 1 to 10, where 1 is a speech delivery having a purely negative tone and 10 is a speech delivery having a purely positive tone.

H. The First Thirty Seconds of the Opening:

In some aspects, an initial period of time, e.g., the first thirty seconds, of the speech may be particularly analyzed to determine whether the speech delivery matches a preferred format for opening a speech. For example, in some aspects, the initial period of time may be analyzed to determine whether the user presented a question or interesting fact, to determine a level of energy in the user's delivery, to determine a tone of the user's voice, to determine whether the initial period of time of the speech is "you" focused on the audience, and to determine an audience reaction or feedback to the initial period of time. The initial period of time of the speech delivery may be rated, for example, on a scale of 1 to 10 for how well the speech delivery matches the criteria for the preferred format. Any other rating may be used. In some aspects, the analysis may indicate whether the user has met the preferred format and if not, which components of the preferred format are missing.

I. Use of Descriptive Language:

This analysis may determine whether the user has used descriptive language during the speech. The audio speech data 118 may be analyzed by computing device 140 or analysis engine 160 to generate text which may be analyzed for descriptive language. Descriptive language may include, for example, language that focuses the five senses including sight, hearing, smell, touch, taste or other similar descriptive language. The use of descriptive language during speech delivery may allow for an instant and easy connection with the audience based on the audience. For example, if the user is describing a culinary product during the speech deliver, the user may describe attributes of the culinary product including, for example, the taste of the product, the look of the product, the texture of the product, the temperature of the product, etc., as a way of connecting and engaging with the audience. The speech delivery may be rated, for example, on a scale of 1 to 10 for how often descriptive language occurs. Any other rating may be used. In some aspects, the analysis may indicate where the descriptive language occurred in the speech delivery and any portions of the speech delivery that lacked any descriptive language.

J. Use of Quotes:

This analysis may determine whether the user has used quotes during the speech. The audio speech data 118 may be analyzed by computing device 140 or analysis engine 160 to generate text which may be analyzed for the use of quotes. For example, the user's speech may be compared to a database of quotes or other language sources to determine whether a quote was used, and if used, was properly attributed to the source. The speech delivery may be rated, for example, on a scale of 1 to 10 for how quotes are used. Any other rating may be used. In some aspects, the analysis may indicate where quotes occurred in the speech delivery.

K. Sentence Structure, Topic Flow, Transitions Between Thoughts:

This analysis may determine whether the user has used proper sentence structure, good topic flow, and good transitions between thoughts. The audio speech data 118 may be analyzed by computing device 140 or analysis engine 160 to generate text which may be analyzed for sentence structure, topic flow, and transitions between thoughts. For example, the text of the user's speech delivery may be analyzed by analysis engine 160 to determine whether the text follows grammatically correct sentence structure. For example, analysis engine 160 may be trained using grammar resources such as English or other language text books, literary papers on grammar, or other similar sources of grammar rules which then may be applied to the text of the user's speech delivery. In some aspects, analysis engine 160 may also be trained, for example, using text books, papers, or other similar sources on the assessment and analysis of topic flow and transitions between thoughts in a speech. For example, the use of particular transition words may be analyzed to determine where there are transitions in the speech delivery. Analysis engine 160 may perform an analysis on the text to determine whether the user's speech delivery has a good topic flow and transitions well between thoughts. The analysis may also determine how much time has passed between each thought or concept before the user transitions to the next thought or concept. For example, the speech delivery may be rated, for example, on a scale of 1 to 10 for each of sentence structure, topic flow, and transitions between thoughts. Any other rating may be used. In some aspects, the analysis may also indicate where in the speech delivery the sentence structure, topic flow, or transitions between thoughts may need to be improved based on the analysis.

L. Speech Conclusion:

In some aspects, the conclusion of the speech may be particularly analyzed to determine whether the speech delivery matches a preferred format for concluding a speech. For example, in some aspects, the conclusion may be analyzed in conjunction with the opening to determine whether the conclusion relates to the opening. In some aspects, for example, the conclusion may be analyzed to determine whether the conclusion was up-beat and positive. For example, the tone of the conclusion and the content of the conclusion may be analyzed for energy level and positivity. The conclusion of the speech delivery may be rated, for example, on a scale of 1 to 10 for how well the speech delivery matches the criteria for the preferred format including relating the conclusion to the opening and whether the conclusion is up-beat and positive. Any other rating may be used. In some aspects, the analysis may indicate whether the user has met the preferred format and if not, which components of the preferred format are missing from the conclusion. The analysis may also indicate where in the conclusion the user is not up-beat or positive.

M. Audience Participation:

This analysis may determine how the audience participated in the user's speech delivery. For example, using an audio sensing device 110 positioned near the audience, audio speech data 118 for the audience may be generated including questions posed by the audience to the user, laughter, positive or negative remarks made by the audience about the user or the speech, or other similar audio data. In some aspects, the audio speech data 118 of the audience may be analyzed by computing device 140 or analysis engine 160 to generate text corresponding to the speech delivery. The text of the audience's interactions with the user may be analyzed by analysis engine 160 for content, including the topics of the questions, how the question relates to a specific portion of the speech (e.g., was a part of the speech confusing), or other similar analysis of the audience's reaction. In addition or alternatively, analysis engine 160 may analyze the audio speech data 118 captured from the audience to determine a level of laughter caused in response to one or more parts of the user's speech delivery. For example, did the audience laugh at a particular joke, how long did the audience laugh for, how hard did the audience laugh, etc. This analysis may be used to determine whether a particular statement or joke in the speech provided the desired effect on the audience. In some aspects, for example, the audience's reaction to the speech delivery may be rated, for example, on a scale of 1 to 10. Any other rating may be used. In some aspects, the analysis may also indicate where in the speech delivery the audience reacted to the user's speech delivery and whether or not the audience reacted as expected based on the content of the user's speech delivery.

N: Use of Audience Participation:

Using M as a basis, the analysis may also determine how well the user used the audience's participation. For example, the analysis may determine how well the user answered a question, whether the user followed up on audience laughter with similar concepts, whether the user changed a direction of the speech delivery when there was a lack of laughter at a part of the speech that expected laughter, or other similar determinations on how well or appropriately the user reacted to the audience. In some aspects, for example, the user's use of audience participation may be rated, for example, on a scale of 1 to 10. Any other rating may be used. In some aspects, the analysis may also indicate where in the speech delivery the user did or did not make good use of the audience participation.

O. The Correlation of Movement to the Speech Delivery.

As mentioned above, movement and presentation of the user may be captured using one or both of visual sensing device 120 and motion sensing device 130. For example, visual sensing device 120 may be used to capture a sense of motion of the user during speech delivery including whether the user is pacing, moving around, fidgeting, or other similar tells. Likewise, motion sensing device 120 may be used to capture actual motion of a portion of the user's body, for example, a hand, arm, chest, head, etc. The visual speech data 128 and motion speech data 138 may be analyzed by analysis engine 160 in conjunction with audio speech data 118 to determine whether the user has performed appropriate body motions in conjunction with the speech delivery. For example, the audio speech data 118 of the audience may be analyzed by computing device 140 or analysis engine 160 to generate text corresponding to the speech delivery. The text may then be analyzed by analysis engine to determine whether a particular portion of the speech delivery should be calming or energetic. The analysis engine 160 may then compare the determination to the visual speech data 128 or the motion speech data 138 to determine whether the user was indeed calming or energetic at the appropriate points in the speech delivery. In some aspects, for example, how well the user's physical presentation of the speech delivery matched the context of the speech text may be rated, for example, on a scale of 1 to 10. Any other rating may be used. In some aspects, the analysis may also indicate where in the speech delivery the user failed match the physical presentation to the context of the speech.

In some aspects, the analysis may determine whether the user is moving enough or making appropriate speech enhancing motions during delivery of the speech. For example, a common issue with novice speech delivery is not moving at all, standing where you are, reading from a paper without looking up, and holding the paper, podium, table etc. In some aspects, the visual speech data 128 and motion speech data 138 may be analyzed to determine whether the user is performing these common novice actions and may indicate at what parts of the speech the user has failed to move enough or look at the audience.

P. Identify a Mismatch Between Tone and Words Used:

In some aspects, the analysis performed by analysis engine 160 may determine whether a tone of the user when speaking a word during the speech delivery matches the actual word that is used. For example, analysis engine 160 may be trained with a corpus of words and associated tones and analyze the words and tones used by the user during the speech delivery to determine whether the words and tones match. For example, if the tone of the word or sentence is intended to be calming, but the user delivers the word or sentence at a fast pace or with high energy, the analysis may identify the word or sentence as having a mismatch between tone and the words used. In some aspects, for example, how well the words and tones of the user's speech deliver match may be rated, for example, on a scale of 1 to 10. Any other rating may be used. In some aspects, the analysis may also indicate where in the speech delivery the words and tones used by the user do not match.

Q. Compare Pre-Written Speech to Speech Delivery:

In some aspects, analysis engine 160 may compare a text version of the speech provided by the user prior to speech delivery to the speech as delivered to determine whether the speech delivery deviates from the text version. For example, the analysis may determine whether the user skipped words, sentences paragraphs, etc. In some aspects, the analysis may determine whether the timing of the speech delivery matched an expected timing based on the text, e.g., did the user deliver the speech too quickly or too slowly? In some aspects, for example, the amount of deviation from the pre-delivery text version of the speech to the speech delivery may be rated, for example, on a scale of 1 to 10. Any other rating may be used. In some aspects, the analysis may also indicate where the speech delivery deviated from the pre-delivery text version of the speech.

R. Compare Speech Delivery to Speeches by Other Speakers:

In some aspects, analysis engine 160 may be trained using a corpus of speeches by other speakers that are known to be high quality speeches or speeches. For example, speeches by well known orators such as Franklin D. Roosevelt, Theodore Roosevelt, Ronald Reagan, Winston Churchill, and other similar high profile orators may be used to train analysis engine. In some aspects the analysis may identify which speaker the user's speech delivery matched the most. In some aspects, the user may provide a particular orator during the criteria selection and the analysis may compare the user's speech and speech delivery to that orator. Any differences between speech writing and delivery system may then be identified and provided to the user along with feedback on how to adjust the speech or speech delivery to better match that orator.

S. Compare Speech Delivery to Past Speech Delivery of the Same Speech:

In some aspects, analysis engine 160 may compare the speech delivery to prior deliveries of the same speech by the user. For example, computing device 140 or analysis engine 160 may store previous speech data for later use in comparison to the audio speech data 118, visual speech data 128, and motion speech data 138. The analysis engine 160 may determine whether there is any improvement or regression in the user's speech delivery and may indicate where in the speech delivery each improvement or regression occurred. In addition, for example, the user may indicate in the selection criteria a particular topic that the user is focusing on for the speech delivery and may receive feedback about whether the user's goal has been met based on the analysis.

T. Analysis of Pre-Speech Text:

In some aspects, analysis engine 160 may analyze the pre-speech text provided to computing device 140 by the user using any of the above text based analysis tools to provide an analysis report for the text prior to the speech delivery.

In some aspects, the analysis of the speech delivery is performed after the speech has been completed. For example, audio sensing device 110, visual sensing device 120, and motion sensing device 130 may each store the corresponding audio speech data 118, visual speech data 128, and motion speech data 138 until the speech delivery is complete before providing the speech data 118, 128, and 138 to computing device 140 or analysis engine 160 for analysis. In some aspects, the speech data 118, 128, and 138 from each device may be manually transferred to computing device 140, e.g., using a portable memory device such as a universal serial bus (USB) stick, where, for example, one or more of audio sensing device 110, visual sensing device 120, and motion sensing device 130 are not connected to a network or directly to computing device 140. In some aspects, the speech data 118, 128, 138 may be capture by audio sensing device 110, visual sensing device 120, and motion sensing device 130 off-line and a connection may be established to devices 110, 120, and 130 by computing device 140 after speech delivery is complete.

In some aspects, analysis engine 160 may provide an analysis report to computing device 140 including an analysis based on the selected analysis criteria 154. The analysis report may be presented to the user on display 146 of computing device 140 and may be saved in the user profile in memory 144 of computing device 140. In some aspects the analysis report may also be stored or saved remotely, for example, in memory associated with analysis engine 160.

The analysis report may include, for example, an objective analysis of the speech delivery that may be used by the user to determine whether the analysis matches the user's desired presentation goals.

In some aspects, the analysis report provided by analysis engine 160 may include recommendations or suggested changes to the user's speech delivery. For example, analysis engine 160 may include or have access to databases of known speeches or speech styles that may be applied to the user's speech delivery to provide suggestions.

Figure 2:
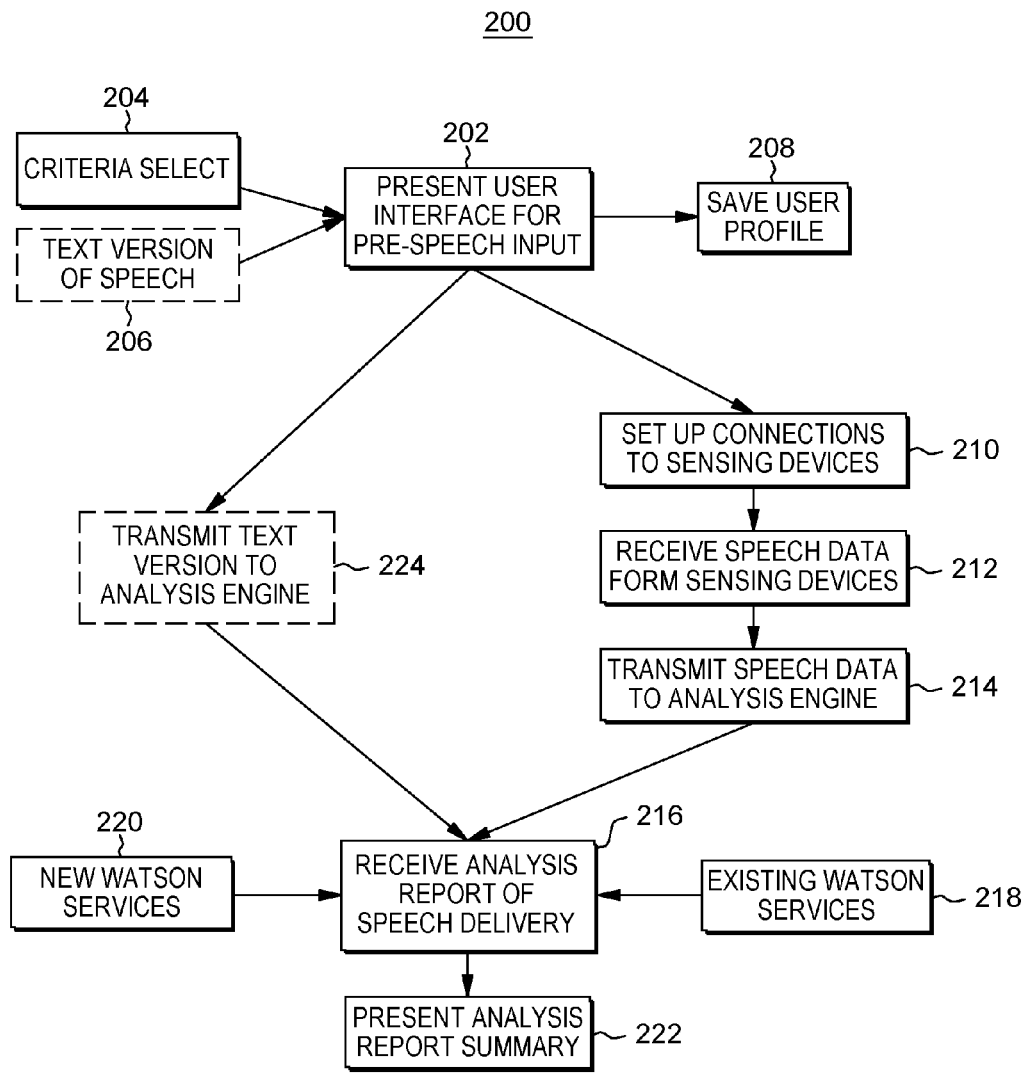
FIG. 2 is a flow chart of a method according to an embodiment of the present disclosure.

With reference now to FIG. 2, a method 200 for analyzing the speech delivery of a user is illustrated.

At 202, the user is presented with a plurality of speech delivery analysis criteria. For example, computing device 140 may present speech delivery analysis criteria 154 to the user in a graphical user interface via display 148.

At 204, a selection of at least one of the speech delivery analysis criterion is received from the user, for example via a user input 150.\

At 206, in some aspects, the user may also optionally submit a text version of the user's speech for analysis.

At 208, in some aspects, the user's selection of the speech delivery analysis criterion may be saved to a user profile in memory 144 for later use. For example, the next time the user is presented with the plurality of speech delivery analysis criteria, the previously selected criteria may already be shown as selected to allow the user to easily proceed with the same selections.

At 210, a connection may be established with one or more sensing devices that are configured to capture the user's speech delivery. For example, a connection may be established between computing device 140 and one or more of audio sensing device 110, visual sensing device 120, and motion sensing device 130. In some aspects, the connection may be established after the user has already delivered the speech and the audio speech data 118, visual speech data 128, and motion speech data 138 has already been captured by audio sensing device 110, visual sensing device 120, and motion sensing device 130.

At 212, speech data captured by the at least one sensing device during the delivery of a speech by the user is received by the computing device. For example, at least one of audio speech data 118, visual speech data 128, and motion speech data 138 may be received by computing device 140 from audio sensing device 110, visual sensing device 120, and motion sensing device 130.

At 214, the speech data and the selected at least one speech delivery analysis criterion may be transmitted to an analysis engine for analysis based on the selected at least one speech delivery analysis criteria. For example, computing device 140 may transmit the received speech data 118, 128, and 138 (or as consolidated into speech data 152) and the received selection of the speech delivery analysis criteria 154 to analysis engine 160.

At 216, an analysis report for the speech data is received from the analysis engine. The analysis report includes an analysis of the speech data performed by the analysis engine based on the selected at least one criterion. For example, where the selected criteria is one or more of A-Q set forth above, analysis engine 160 may analyze the speech data according to the criteria and may generate an analysis report indication potential suggestions or an objective assessment for where the speech could be improved.

At 218, analysis engine 160 may employ existing tools and services implemented, for example, by IBM Watson®, to analyze the speech data and generate the analysis report.

At 220, analysis engine 160 may generate new tools and services by training the analysis engine 160, e.g., IBM Watson®, through the use of a criteria specific training corpus for each selected criterion. The new tools and services may be used to generate the analysis report according to the selected criteria.

At 222, the analysis report may be presented to the user, e.g., via a graphical user on display 152 of computing device 140.

In some aspects, for example where the user has submitted a text version of the user's speech at 206, an optional evaluation of the text version may be performed by analysis engine. For example, at 224 the text version may be transmitted to analysis engine for analysis according to the selected criteria at 216. In some aspects, the text version may be analyzed prior to the delivery of the speech by the user.

Figure 3:
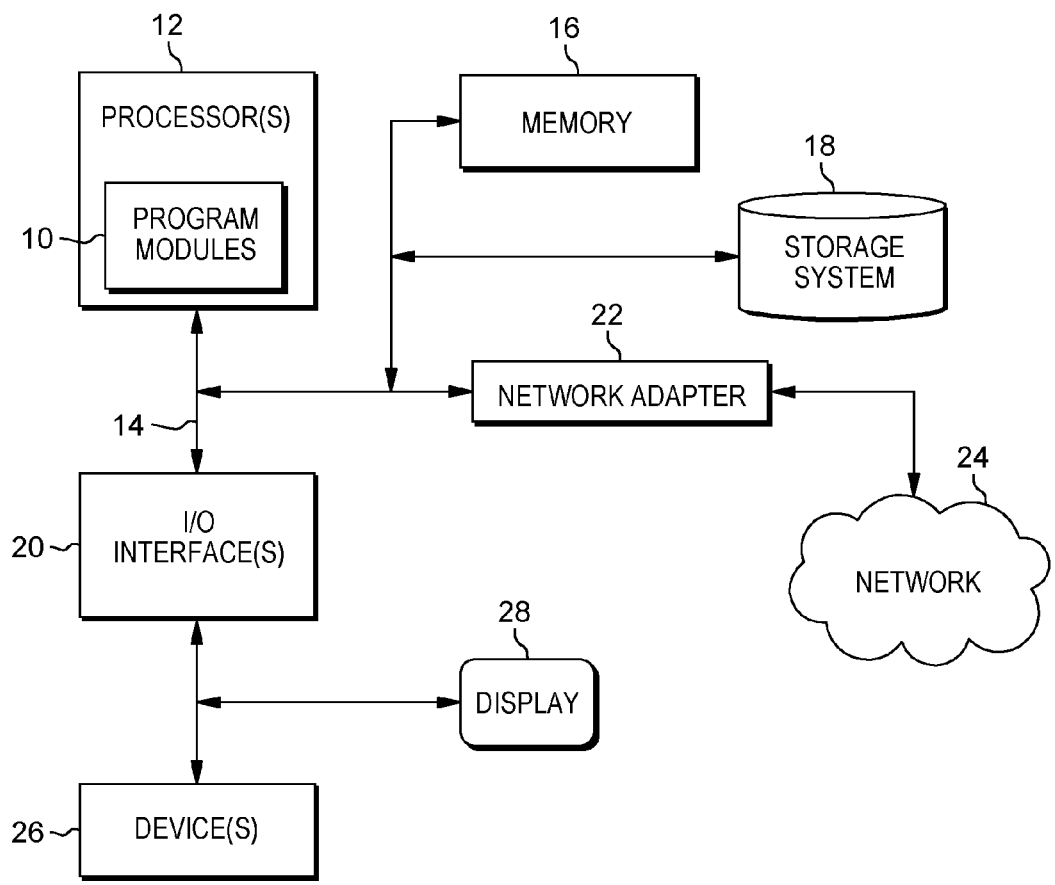
FIG. 3 is an exemplary block diagram of a computer system in which processes involved in the system, method, and computer program product described herein may be implemented.

FIG. 3 illustrates a schematic of an example computer or processing system that may implement any portion of system 100, audio sensing device 110, visual sensing device 120, motion sensing device 130, computing device 140, analysis engine 160, systems, methods, and computer program products described herein in one embodiment of the present disclosure. The computer system is only one example of a suitable processing system and is not intended to suggest any limitation as to the scope of use or functionality of embodiments of the methodology described herein.

The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented by at least one hardware processor for analyzing the speech delivery of a user comprising:
    presenting to a user, via a graphical user interface on a display of a computing device, a plurality of speech delivery analysis criteria for analyzing the speech delivery of the user;
    receiving, from the user via the computing device a selection of at least one of the speech delivery analysis criteria;
    receiving, from the user via the computing device a text version of a speech prior to delivery of the speech by the user;
    transmitting the text version of the speech to an analysis engine for analysis based on the selected at least one of the speech delivery analysis criteria prior to delivery of the speech by the user;
    receiving, by the computing device, from at least one sensing device, speech data captured by the at least one sensing device during the delivery of the speech by the user;
    transmitting the speech data and the selected at least one of the speech delivery analysis criteria to the analysis engine for analysis based on the selected at least one of the speech delivery analysis criteria, the selected at least one of the speech delivery analysis criteria comprising a comparison of the delivery of the speech by the user as captured by the speech data to the text version of the speech received prior to delivery of the speech by the user;
    receiving, from the analysis engine an analysis report for the speech data, the analysis report comprising an analysis of the speech data performed by the analysis engine based on the selected at least one of the speech delivery analysis criteria; and
    presenting, to the user, via the graphical user interface, the analysis report.

2. The method of claim 1, further comprising saving the received selection of the at least one speech delivery analysis criteria to a user profile associated with the user.

3. The method of claim 1, wherein the speech data comprises at least one of audio speech data, visual speech data, and motion speech data.

4. The method of claim 1, wherein the at least one sensing device comprises at least one of an audio sensing device, a visual sensing device, and a motion sensing device.

5. The method of claim 4, wherein the motion sensing device is configured to be affixed to the user.

6. The method of claim 1, wherein the analysis engine is trained with a corpus of data corresponding to the selected at least one of the speech delivery analysis criteria.

7. The method of claim 1, further comprising:
    receiving from the analysis engine an analysis report for the text version of the speech, the analysis report for the text version of the speech comprising an analysis of the text version of the speech performed by the analysis engine based on the selected at least one of the speech delivery analysis criteria; and
    presenting, to the user, via a graphical user interface, the analysis report for the text version of the speech prior to delivery of the speech by the user.

8. The method of claim 1, wherein the received selection of at least one of the speech delivery analysis criteria comprises a selection to compare the delivery of the speech by the user to a speech of at least one well known orator.

9. The method of claim 8, wherein the at least one well known orator is selected by the user.

10. The method of claim 8, wherein the computing device is trained using a training corpus of speeches of the at least one well known orator and is configured to identify, based on the comparison of the delivery of the speech by the user to the speech of the at least one well known orator, which speech of the at least one well known orator the user's speech matches the most.

11. A system for analyzing the speech delivery of a user comprising:
    at least one sensing device configured to capture speech data captured during the delivery of a speech by the user;
    a computing device comprising a display and at least one processor configured to:
        present to the user, via a graphical user interface on the display, a plurality of speech delivery analysis criteria for analyzing the speech delivery of the user;
        receive from the user a selection of at least one of the speech delivery analysis criteria;
        receive from the user a text version of the speech prior to delivery of the speech by the user;
        transmitting the text version of the speech to an analysis engine for analysis based on the selected at least one of the speech delivery analysis criteria prior to delivery of the speech by the user;
        receive from the at least one sensing device, the speech data captured by the at least one sensing device during the delivery of the speech by the user;
        transmit the speech data and the selected at least one of the speech delivery analysis criteria to the analysis engine for analysis based on the selected at least one of the speech delivery analysis criteria, the selected at least one of the speech delivery analysis criteria comprising a comparison of the delivery of the speech by the user as captured by the speech data to the text version of the speech received prior to the delivery of the speech by the user;
        receive from the analysis engine an analysis report for the speech data, the analysis report comprising an analysis of the speech data performed by the analysis engine based on the selected at least one of the speech delivery analysis criteria; and
        present, to the user, via the graphical user interface, the analysis report.

12. The system of claim 11, wherein the at least one processor is further configured to save the received selection of the at least one of the speech delivery analysis criteria to a user profile associated with the user.

13. The system of claim 11, wherein the speech data comprises at least one of audio speech data, visual speech data, and motion speech data.

14. The system of claim 11, wherein the at least one sensing device comprises at least one of an audio sensing device, a visual sensing device, and a motion sensing device.

15. The system of claim 14, wherein the motion sensing device is configured to be affixed to the user.

16. The system of claim 11, wherein the analysis engine is trained with a corpus of data corresponding to the selected at least one of the speech delivery analysis criteria.

17. The system of claim 11, wherein the at least one processor is further configured to:
- receive from the analysis engine an analysis report for the text version of the speech, the analysis report for the text version of the speech comprising an analysis of the text version of the speech performed by the analysis engine based on the selected at least one of the speech delivery analysis criteria; and
- present, to the user, via the graphical user interface, the analysis report for the text version of the speech prior to the delivery of the speech by the user.

18. A non-transitory computer readable medium comprising instructions for analyzing the speech delivery of a user that, when executed by at least one processor, configure the at least one processor to:
- present to the user, via a graphical user interface on a display of a computing device, a plurality of speech delivery analysis criteria;
- receive from the user a selection of at least one of the speech delivery analysis criteria for analyzing the speech delivery of the user;
- receive from the user a text version of a speech prior to delivery of the speech by the user;
- transmitting the text version of the speech to an analysis engine for analysis based on the selected at least one of the speech delivery analysis criteria prior to delivery of the speech by the user;
- receive from at least one sensing device, speech data captured by the at least one sensing device during the delivery of the speech by the user;
- transmit the speech data and the selected at least one of the speech delivery analysis criteria to the analysis engine for analysis based on the selected at least one of the speech delivery analysis criteria, the selected at least one of the speech delivery analysis criteria comprising a comparison of the delivery of the speech by the user as captured by the speech data to the text version of the speech received prior to delivery of the speech by the user;
- receive from the analysis engine an analysis report for the speech data, the analysis report comprising an analysis of the speech data performed by the analysis engine based on the selected at least one of the speech delivery analysis criteria; and
- present, to the user, via the graphical user interface, the analysis report.

19. The non-transitory computer readable medium of claim 18, wherein the analysis engine is trained with a corpus of data corresponding to the selected at least one of the speech delivery analysis criteria.

20. The non-transitory computer readable medium of claim 18, wherein the instructions further configure the at least one processor to:
- receive from the analysis engine an analysis report for the text version of the speech, the analysis report for the text version of the speech comprising an analysis of the text version of the speech performed by the analysis engine based on the selected at least one of the speech delivery analysis criteria; and
- present, to the user, via the graphical user interface, the analysis report for the text version of the speech prior to the delivery of the speech by the user.

* * * * *